Patented Dec. 9, 1947

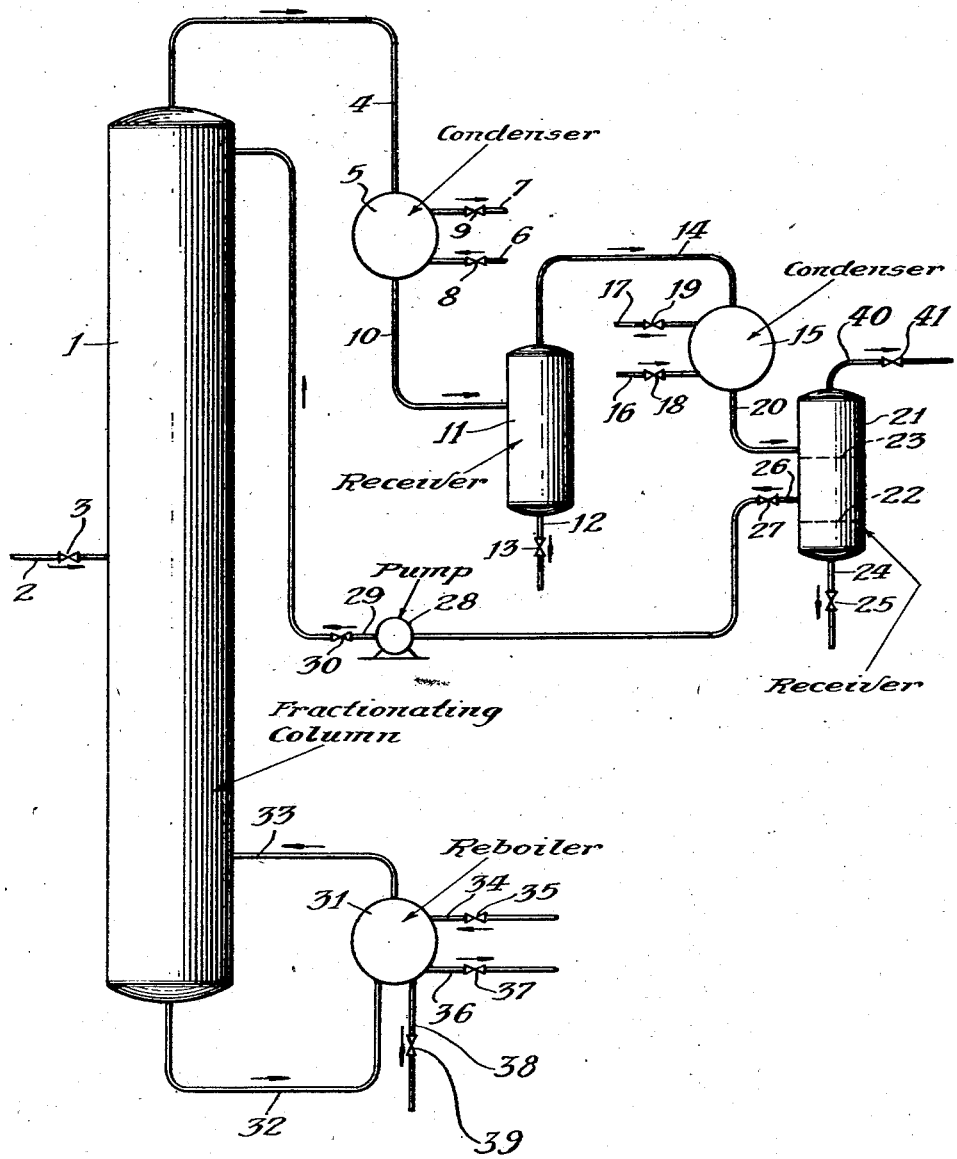

2,432,405

UNITED STATES PATENT OFFICE 2,432,405

SEPARATION OF HYDROGEN FLUORIDE FROM HYDROCARBONS BY DISTILLATION AND PARTIAL CONDENSATION

Clarence G. Gerhold, Chicago, Ill., assignor to Universal Oil Products Company, Chicago, Ill., a corporation of Delaware Application March 31, 1943, Serial No. 481,273

6 Claims. (Cl. 202—69)

This invention relates to the treatment of hydrocarbons and more particularly to a process for the removal of dissolved materials of limited solubilities from hydrocarbons.

More specifically, this invention is concerned with a distilling and condensing process by means of which hydrocarbons containing dissolved materials of limited solubility therein may be substantially freed thereof.

Various materials are soluble to a limited solubility in hydrocarbons and in various processes it is desirable that simple and efficient means be available to accomplish this object. For instance, in alkylation processes employing hydrogen fluoride as a catalyst, it is necessary to remove dissolved portions of the latter from the reaction products.

It is also well known that water is soluble in many hydrocarbons to a limited degree, which, although small, is sufficient to cause difficulties in utilizing the hydrocarbons to their greatest extent. For instance, in commercial propane more commonly referred to as "bottled gas" which is sold extensively throughout the country in rural districts where utility companies are unable to maintain facilities for the distribution of fuel gas, it has been found that small quantities of dissolved water has caused the closure of pressure reducing valves because of ice formations. This takes place due to the refrigeration effected when the pressure of the bottled gas is reduced to the operating pressure of the equipment in which it is being employed as a fuel. The decreased temperature of the gas stream causes the separation of any dissolved water which immediately forms ice or solid hydrate; thus blocking any restricted portions of the fluid conduit handling the gas.

Another instance where water dissolved in hydrocarbons is undesirable is in the process for the alkylation of benzene with ethylene using solid phosphoric acid as a catalyst. This process is contemplated for use in the manufacture of ethylbenzene. In this process, excess quantities of benzene are used, and it is general practice to separate the unconverted benzene after the reaction and recycle it through the process. Due to the nature of the catalyst, this benzene will gradually pick up some water during its passage through the reactor which in time would be excessive for the successful operation of the plant.

It is, therefore, one of the principal purposes of this invention to provide a process for the removal of dissolved water from hydrocarbons containing the same. It will be found applicable to carbons, but, of course, without the same or equivalent results.

It is also a purpose of this invention to provide simple and efficient means for the removal of dissolved hydrogen fluoride from hydrocarbons.

This invention, by employing physical characteristics of water and hydrocarbons, namely, their vapor pressures and mutual solubilities, provides an advantageous method for the drying of hydrocarbons which may be employed in many varied processes.

Because of the above-mentioned physical characteristics of water and hydrocarbons, it is possible to cause dissolved water to pass overhead in a fractionating column and leave lower boiling hydrocarbons unvaporized. This takes place because of the fact that in the liquid phase, the saturation point of the water, that is, the maximum quantity of dissolved water in the hydrocarbon, is very low, while in the vapor phase due to the small difference between the vapor pressures of water and many hydrocarbons, the saturation point for the water vapor in a water vapor-hydrocarbon vapor mixture is relatively high. For instance, in a normal hexane-water solution at about 60° C. and at atmospheric pressure, the saturation point for dissolved water will be about 0.37 mol percent. In the vapor mixture above this solution, the percentage of water for saturation is about 22 mol percent. It can readily be seen from the above facts that in order to attain an equilibrium between the liquid and vapor mixtures, the tendency will be for the water to pass into the vapor mixture more rapidly than the hydrocarbon. This same principle also applies to condensation which is the reverse of vaporization. During condensation, because of the high allowable percentage of water in the vapor, the tendency will be for the hydrocarbon to condense before the water, thereby yielding a relatively dry hydrocarbon liquid.

Although the present invention has been found to give very good results in the removal of water and hydrogen fluoride from hydrocarbons, its principles may be applied to a vast number of other volatile materials having a limited solubility in hydrocarbons and such vapor pressure characteristics that in a liquid-vapor phase system under equilibrium conditions, the concentration of said dissolved material in the liquid is lower than that in the vapor phase.

Broadly, the process of the present invention comprises fractionally distilling hydrocarbons containing dissolved material of limited solubility and having vapor pressure characteristics such that in a liquid-vapor system under equilibrium conditions the concentration of said dissolved material in the liquid phase is lower than that in the vapor phase, and partially condensing the overhead vapors from said fractionation thereby forming a liquid product containing a smaller percentage of dissolved material than said hydrocarbons.

More specifically, this invention comprises treating a hydrocarbon containing dissolved water in a fractionating system wherein at least a portion of the hydrocarbon and substantially all of the water passes overhead, partially condensing said overhead stream to form a liquid product substantially free of water and a vaporous product containing a portion of said hydrocarbon and substantially all of said water, cooling said vaporous product and separating the condensate into a hydrocarbon fraction containing dissolved water and a fraction comprised substantially of free water, returning said separated hydrocarbon containing dissolved water as reflux for the fractionating step and removing free water from the system.

In order to more clearly illustrate the features and advantages of this invention, reference is made to the accompanying diagrammatic drawing and the following description thereof.

In the drawing, charging material to be treated comprising hydrocarbons containing dissolved water therein are introduced to a fractionating column 1 through line 2 controlled by valve 3. Fractionating column 1 may be any of several conventional types now employed containing suitable packing materials or bubble trays. Water and the lighter of the hydrocarbons in the charge will pass from the column through line 4 into condenser 5 wherein conditions are so regulated that only partial condensation takes place, the heat of condensation being removed by a suitable cooling medium introduced to and withdrawn from condenser 5 by means of lines 6 and 7 controlled by valves 8 and 9 respectively. The cooled product from condenser 5 comprising a partially liquid and partially vapor stream is then directed by means of line 10 to receiver 11 wherein the liquid condensate will be separated from the remaining vapors and withdrawn through line 12 controlled by valve 3. This liquid condensate, due to the low solubility of water in hydrocarbons and the relatively small difference in the vapor pressures of hydrocarbons and water will contain dissolved water in amounts very much smaller than in the charge to the system. The uncondensed vapors in receiver 11 will be withdrawn through line 14 and directed into condenser 15 wherein conditions are controlled to condense the major portion of the remaining hydrocarbons and water. A suitable cooling medium for condenser 15 may be introduced thereto and withdrawn therefrom by means of lines 16 and 17 controlled by valves 18 and 19 respectively.

The condensate from condenser 15 is directed by means of line 20 into receiver 21 wherein water will settle to form a lower layer, the upper extent of which is indicated by dotted line 22 and the hydrocarbons, an upper layer containing a small percentage of dissolved water, the upper extent of which is indicated by dotted line 23. The water removed in the process and settled in receiver 21 is withdrawn through line 24 controlled by valve 25. The hydrocarbons containing dissolved water are removed from receiver 21 by means of line 26 controlled by valve 27 and directed into pump 28 wherefrom they are directed through line 29 and valve 30 to the upper portion of fractionating column 1 to reflux the column.

Heat for vaporization is introduced to fractionating column 1 by means of reboiler 31 connected thereto by means of lines 32 and 33. Any suitable heating medium may be supplied to reboiler 31 through line 34 controlled by valve 35 and withdrawn therefrom by means of line 36 controlled by valve 37. The bottoms from fractionating column 1 containing the heavier higher boiling hydrocarbons will be removed from the system by means of line 38 controlled by valve 39. Any uncondensed vapors or gases may be withdrawn from receiver 21 through line 40 controlled by valve 41.

It can be readily seen that the present invention presents means for freeing dissolved water from a wide range of hydrocarbons not only those higher boiling than water but also those lower boiling than water which can be liquified at moderate conditions, for instance, hydrocarbons having more than two carbon atoms to the molecule.

In some instances where a product of higher purity is desired, the liquid product from the partial condensation may be subjected to one or more additional stages of similar treatment of fractional distillation and partial condensation.

In order to demonstrate the utility of this invention, the following specific example illustrating the operation of the process is included in this specification.

Employing equipment such as is illustrated in the accompanying drawing, the effluent stream from a catalytic alkylation process employing hydrogen fluoride as a catalyst is charged to the fractioning column 1 by means of line 2 and valve 3. This stream contains about 8 pounds of propane and 0.8 pound of hydrogen fluoride per hundred pounds of feed together with unreacted isobutane and normal butane as well as alkylate. Fractionating column 1 is operated at about 230 pounds per square inch and at a top temperature of about 106° F. Employing a reflux ratio of 1.5 to 1 based on the feed to the column, the overhead stream therefrom contains (based on 100 pounds of feed) 158 pounds of propane and 2.45 pounds of hydrogen fluoride. This stream is partially condensed in condenser 5 which is operated at about 104° F. and a liquid product containing 8 pounds of propane and 0.024 pound of hydrogen fluoride per hundred pounds of feed is withdrawn from receiver 11 through line 12 controlled by valve 13. Vapors from receiver 11 passing through line 14 contain 150 pounds of propane and 2.426 pounds of hydrogen fluoride based on 100 pounds of feed. These vapors are condensed in condenser 15 which is operated at about 100° F. and directed into receiver 21 wherein two liquid layers will be formed, the upper layer containing propane, substantially saturated with hydrogen fluoride and the lower layer comprising substantially pure hydrogen fluoride. The hydrogen fluoride will be withdrawn at a rate of about 0.776 pound per hundred pounds of feed through line 24 controlled by valve 25. The reflux to column 1 which is withdrawn from receiver 21 through line 26, valve 27 and pump 28 wherefrom it is directed to the column through line 29 controlled by valve 30 will be at a rate of about 150 pounds of propane and 1.65 pounds of hydrogen fluoride per hundred pounds of feed to the column. The propane hydrogen fluoride stream withdrawn from receiver 11 through line 12 and valve 13 will contain about 0.31% hydrogen fluoride as compared to about 1.1% hydrogen fluoride in propane which is obtainable by conventional methods.

The above specific examples have been included in this specification in order to more clearly illustrate the utility of the invention and are not to be misconstrued as unduly limiting its broad scope.

I claim as my invention:

1. A process for the treatment of hydrocarbons containing dissolved hydrogen fluoride which comprises fractionally distilling the solution to vaporize a portion of said hydrocarbons and substantially all of said hydrogen fluoride, partially condensing the resultant vapors thereby forming a hydrocarbon condensate containing a smaller percentage of dissolved hydrogen fluoride than the original hydrocarbons, recovering said condensate, and withdrawing uncondensed vapors comprising substantially all of the hydrogen fluoride vaporized in the distillation step.

2. The process of claim 1 further characterized in that said hydrocarbons comprise paraffin hydrocarbons.

3. The process of claim 1 further characterized in that said hydrocarbons comprise propane.

4. A process for the treatment of hydrocarbons containing dissolved hydrogen fluoride which comprises fractionally distilling the solution to vaporize a portion of said hydrocarbons and substantially all of said hydrogen fluoride, removing the resultant vapors and partially condensing the same to form a hydrocarbon condensate and residual uncondensed vapors comprising a portion of said hydrocarbons and substantially all of said previously vaporized hydrogen fluoride, recovering said hydrocarbon condensate, effecting complete condensation in a separate condensation zone of said uncondensed vapors, introducing the resultant condensate from the complete condensation step into a settling zone wherein a liquid hydrocarbon phase substantially saturated with hydrogen fluoride and a separate hydrogen fluoride phase are formed, withdrawing said hydrogen fluoride phase, and returning said hydrocarbon phase as reflux to the fractional distillation step.

5. The process of claim 4 further characterized in that said hydrocarbons comprise paraffin hydrocarbons.

6. The process of claim 4 further characterized in that said hydrocarbons comprise propane.

CLARENCE G. GERHOLD.

REFERENCES CITED

The following references are of record in the file of this patent:

UNITED STATES PATENTS

| Number | Name | Date |
|---|---|---|
| 1,472,384 | Brown | Oct. 30, 1923 |
| 1,730,892 | Leslie | Oct. 8, 1929 |
| 1,962,153 | Peterkin | June 12, 1934 |
| 2,350,006 | Wolfner | May 30, 1944 |
| 1,916,349 | Van Ackeren | July 4, 1933 |
| 2,070,864 | Ragatz | Feb. 16, 1937 |
| 2,115,401 | Shiffer | Apr. 26, 1938 |
| 2,215,062 | Atwell | Sept. 17, 1940 |
| 2,347,317 | Gibson | Apr. 25, 1944 |
| 2,107,156 | Kuhn | Feb. 1, 1938 |
| 2,251,771 | Wynn | Aug. 5, 1941 |